Patented June 23, 1936

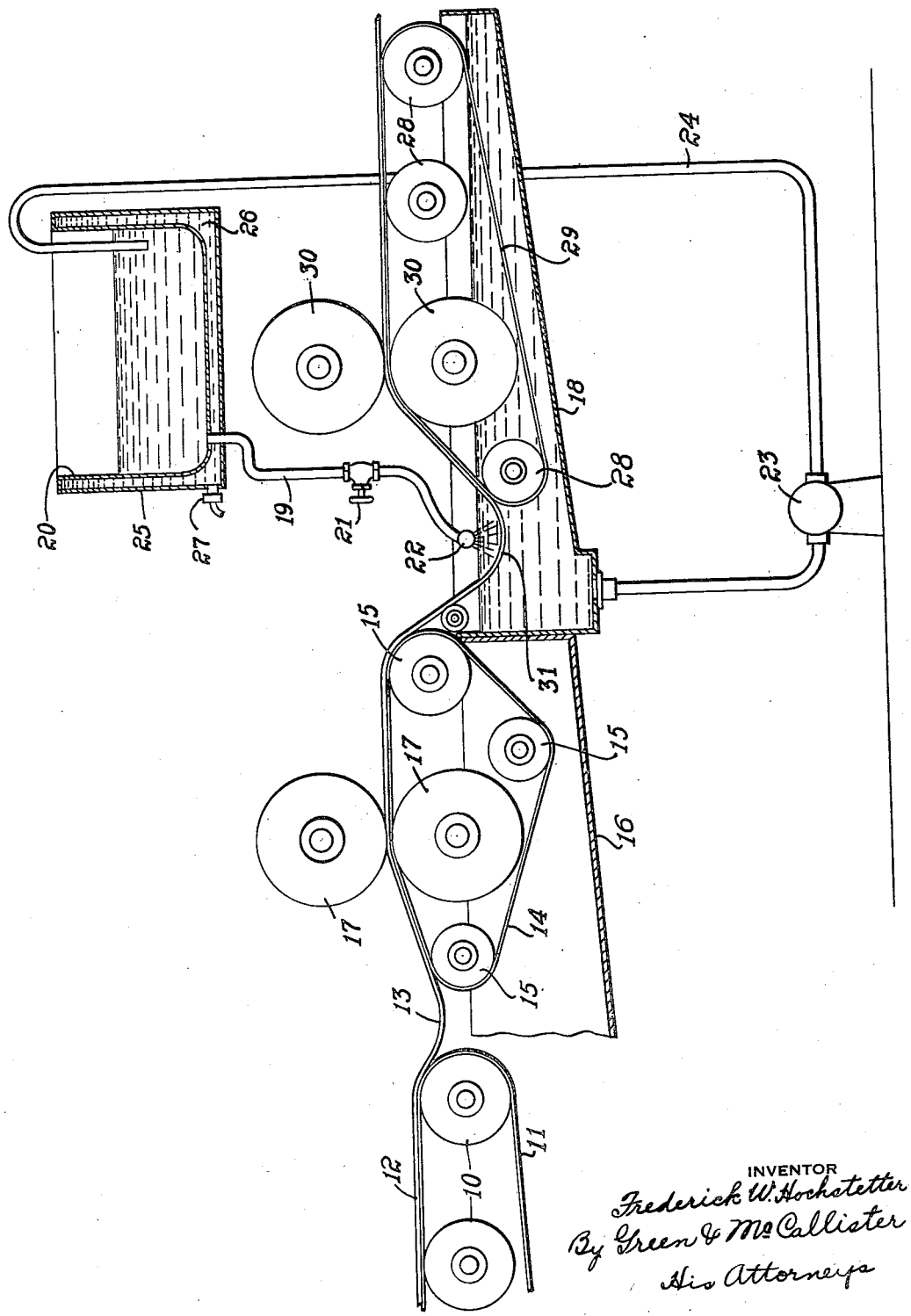

2,045,139

UNITED STATES PATENT OFFICE 2,045,139

COLORED AND FLAMEPROOFED MATERIAL

Frederick W. Hochstetter, Pittsburgh, Pa.

Application July 13, 1933, Serial No. 680,240

9 Claims. (Cl. 91—68)

My present invention relates to a solvent for dyestuffs for use in coloring suitable mediums and for applying such coloring to such mediums with or without the simultaneous flame-proofing of the mediums.

The invention also comprises a coloring and flame-proofing composition of matter and a process for making the same and for flameproofing and coloring any suitable mediums in a single operation.

According to the known practice, a medium is colored by first treating it with any of the well-known mordanting baths to prepare the medium for the coloring or dyeing operation and so that when subjected to the color or dye a permanent union with the coloring matter is produced so that the dye will not wash out of the medium when it is subjected to water, as in washing. The medium is then subjected to the dyeing or coloring process as a separate operation. When flameproofing is additionally desired the finished dried colored product is then further subjected to the flameproofing process. In many cases, however, the coloring and flameproofing are likely to have deleterious effects upon each other to the detriment either of the dye or of the flameproofing. The results are, moreover, not entirely satisfactory.

One of the objects of the present invention is to flameproof and dye a suitable medium in a single operation, thus avoiding defects and disadvantages inherent in the prior art procedure.

Another object is to produce a flameproofed and dyed composition of matter in a surer and more economical manner and one which eliminates the multiple procedures of the prior art.

A further object is to provide a composition of matter capable of flameproofing, mordanting and coloring a suitable medium in a single operation.

A still further object is to provide a composition of matter according to the preceding objects which may be used under neutral, alkaline or acidic conditions in accordance with predetermined requirements.

An object is also to provide a compound solvent for a dyestuff for use in connection with cellulose and/or cellulosic derivatives which is cheaper and more economical than coloring and/or coloring and flameproofing according to other procedures.

An added object is also to prevent so-called "bleeding" of the dyestuff by utilizing the solvent compound according to my present invention and to provide therefor a combination solvent and mordant.

Furthermore, I provide a method and apparatus for applying the composition to cellulose, cellulosic derivatives and/or other suitable mediums.

Other and further objects and advantages will be understood by those skilled in the art or will be apparent or pointed out hereinafter.

It is well-known that most of the coloring of cellulose, its derivatives, etc., is conducted by dyeing the pulps, fibers, etc. from which the medium is made in the beaters or hydrators resulting in great waste of dye by washing out or diluting in the water used to float the pulps. I accordingly, first produce an aqueous solvent for the coloring matter including mordant stock solution consisting of zinc sulphate, boric acid, or other suitable mordanting compounds.

As a preferred solvent I may use the following:

| | |
|---|---|
| Water | 10 gallons |
| Ammonia water (saturated) | 400 c. c. |
| Sulphuric acid (commercial) | 1000 c. c. |
| Suitable or required dye | 1 pound |

If a less intense color is desirable, this stock solution may be diluted by adding additional solvent compound in the above proportions without adding further dyestuffs. To increase the acidity, when required, about 2% of acetic acid solution of commercial grade may be added or if a neutral solvent is desired neutralization with ammonia (aqua) or other suitable base is effected.

I have discovered that by the present invention I can mordant, color and flame-proof any suitable medium with a single composition of matter in a single operation. At the same time I produce a more brilliantly colored washproofed and flame-proofed medium and one which is more economically secured and which prevents waste of material.

I have further discovered that the composition of matter hereinafter disclosed and the process by which the same is made may be used in connection with any type of absorbent material and that the composition of matter may vary in strength and amount depending upon the particular medium to be treated, the characteristics thereof and the results desired.

The following is an example of one preferred composition of matter and the process of making the same, it being understood that I am not limited thereto except as set forth by the subjoined claims.

To form a first solution I heat 5000 c. c. of meta-gelatine solution to about 110° F. and to the same I add about 1,000 grams of ammonium sulphate and about 500 grams of ammonium carbonate in the order named. Since considerable effervescence takes place I take suitable precautions to avoid loss of material and I utilize a container capable of holding at least twice as much liquid as is contained in the complete formula. Suitable agitation may be carried out during the addition of the ammonium sulphate and the ammonium carbonate and before proceeding further I await subsidence of the effervescence and until a complete solution is obtained. The meta-gelatine solution may be prepared in accordance with my Patent No. 1,772,081 of August 5, 1930 and consists, briefly stated, of 4,000 c. c. water and 2% gelatine which has been boiled for 2 hours.

I next prepare a second solution which consists of 2,500 c. c. of water at 150° F. in which 500 grams of boric acid are dissolved under constant stirring. The temperature is then reduced to 110° F. and the second solution is thoroughly mixed with the first solution.

I then prepare a third solution which contains 2,500 c. c. of water at 110° F. in which 430 grams of zinc sulphate or other suitable mordanting agent has been dissolved under continuous stirring and to which a predetermined amount of acidified dye solution has been added; that is, enough to give the desired color. When the solution is complete I add the same to the first solution and then I finally add 1,000 c. c. of 2% neutral lime soap suspension containing 2% starch. The entire batch of materials is then thoroughly mixed together and digested at about 120° F. for thirty minutes to form the composition of matter. Thereafter it may be applied to the medium in any convenient manner.

The composition of matter may consist, therefore, of substantially the following ingredients in substantially the following proportions:

| | |
|---|---|
| Meta-gelatine solution | 5000 c. c. |
| Ammonium sulphate | 1000 grams |
| Ammonium carbonate | 500 grams |
| Boric acid | 500 grams |
| Zinc sulphate (or other mordant) | 430 grams |
| 2% neutral lime soap containing 2% starch | 1000 c. c. |
| Acidified dye solution sufficient to color | |
| Water (sufficient to control concentrations) | 5000 c. c. |

While I prefer to use the above composition of matter I am not limited thereto as above stated. The compositions of matter disclosed in my copending applications Serial No. 651,363, filed January 12, 1933; 662,291, filed March 23, 1933 and 664,339, filed April 4, 1933 may be and have been successfully used. In addition, the mordanting and coloring as above set forth may be used in conjunction with other flame-proofing compositions of matter by modifying the same in accordance with predetermined requirements as will be understood by those skilled in this art. I may in addition, produce the colored flame-proofed medium directly from the pulps, fibers, etc. from which the medium is made such as is disclosed in my copending application 664,339, filed April 4, 1933 and in this event a suitable sizing compound or material may be incorporated with the coloring and flame-proofing composition of matter herein-defined.

In the accompanying drawing I have illustrated an apparatus for and mode of applying any of the above-noted compositions of matter to a medium, the single figure indicating the same partly in elevation and partly in vertical section.

Numeral 10 represents two of the rolls of a Fourdrinier machine or other fibrous web-forming machine such as one used for making kapok products, or for various fabrics, papers and other cellulosic mediums and derivatives including felted media. These rolls 10 are provided with a belt 11, of felt or the like. The formed media 12 passes off of the machine at rolls 10. It is understood that the pulp from which the medium is formed is hydrated in the usual manner, floated onto the Fourdrinier machine, felted etc., if required, and excess water eliminated through the usual Fourdrinier machine screw by suction or other suitable means, thereby bringing about formation of the medium in accordance with predetermined requirements.

Via a short loop 13 the medium 12 is then picked up by felt belt 14 passing around rolls 15 disposed in a suction box 16. Felt belt 14 also passes between squeeze rolls 17, as shown, and as the medium passes between such rolls any remaining excess water content in the medium is eliminated.

Treating tank 18, of the character shown, is supplied with composition of matter through pipe 19 leading from the bottom of supply tank 20. Pipe 19 is provided with a suitable valve 21 and, if desired, with a spray head or nozzle 22. Composition of matter is pumped by means of pump 23 through return pipe 24 to supply tank 20 for reuse. Tank 20 is provided with means including a double wall 25, fluid 26 and thermostatic control means 27 so that the composition of matter may be maintained at the required or predetermined temperature.

Tank 18 is provided with rolls 28 around which passes belt 29 so that the medium 13, via loop 31, may be suitably passed through and treated with the composition of matter. Squeeze rolls 30, between which belt 29 and medium 13 pass, eliminate excess composition of matter from the thus treated or impregnated medium.

The medium then passes to an evaporating chamber (not shown) having temperature controlled air currents and is then conveyed to and passed over dandy rolls or other suitable drying means (not shown). The pressure of the drying rolls is adjusted in accordance with predetermined requirements where the thickness and uniformity of the medium is finally controlled. The medium is then again conveyed to air-drying chambers at normal temperatures and finally calendered or otherwise suitably finished. If desired, any or all rolls and belts, and the suction box, may be provided with suitable suction means, which may be controllable as to extent of suction, in order to expel the maximum amount of liquid in the shortest time, thus leaving the finished product with just the required amount of moisture to be evaporated during the drying.

Rolls 17 and 30 are operated synchonously in known manner so that loops 13 and 31 are maintained and so as to avoid undesirable stresses on the medium. A small guiding roll (unnumbered) suitably directs the medium from roll 15 into tank 18.

It will be understood that variations from the foregoing are contemplated to meet the requirements of any particular set of circumstances, for example, to meet the conditions of neutrality, alkalinity or acidity involved in the use of any particular dye and/or mordant and/or flame-proofing composition or process. The amounts and temperatures represent values successfully used by me but these too may be varied depending upon the nature of the medium and the other factors involved. Some mediums are more easily colored and flame-proofed than others and some are attacked by the composition of matter more strongly than others in which event I may vary the amounts or the concentrations of the materials so as to obtain the best results for each particular case.

For example, where a neutral dye solution is required the dye may be dissolved in alcohol or in 10% alcohol diluted with water. Other modifications and substitutions, variations and omissions are also within the spirit and scope of the present invention. Again, while the foregoing represents the preferred embodiment of my invention, I may if I so desire obtain fairly good results by first subjecting the medium to a mordanting bath, drying the same, then subjecting the medium to a coloring or dyeing bath and drying, and finally subjecting the medium to a flame-proofing composition of matter and drying. This also results in a finished flame-proofed colored product in a single continuous operation and may, for instance, be accomplished by the apparatus and process of my aforesaid Patent 1,772,081.

I have used the term medium in both a broad and a restricted sense as including various types of cellulosic or aqueous cellulosic media or derivatives thereof, either natural or manufactured, such as those set forth in my aforesaid copending applications and patent for use in the industrial arts.

What I claim as new and desire to secure by Letters Patent is:

1. A process for coloring and flame-proofing a cellulosic medium comprising heating 5000 c. c. of meta-gelatine solution to about 110° F., adding thereto 1000 grams of ammonium sulphate and 500 grams of ammonium carbonate; preparing a solution of 500 grams of boric acid in 2500 c. c. of water at 150° F., cooling to 110° F. and adding the same to the meta-gelatine-ammonium sulphate-ammonium carbonate solution; preparing a solution containing 2500 c. c. of water at 110° F., 430 grams of zinc sulphate and enough acidified dye solution to yield the desired coloring effect and adding the same to the foregoing solutions; adding 1000 c. c. of 2% neutral lime soap suspension containing 2% starch; mixing and digesting all the solutions for about 30 minutes at about 120° F.; and finally suitably applying the same to the medium.

2. A process for coloring and flame-proofing a cellulosic medium comprising preparing as a first composition a solution containing meta-gelatine, ammonium sulphate and ammonium carbonate; preparing as a second composition a solution containing boric acid and water; preparing as a third composition a solution containing water, zinc sulphate and dye; preparing as a fourth composition a suspension containing lime soap and starch; mixing and digesting all four solutions; and finally suitably applying the same to the medium.

3. A process for coloring and flame-proofing a cellulosic medium in a single operation comprising making up a treating bath containing meta-gelatine, ammonium compounds, zinc sulphate, a dye and a soap, and applying the same to the medium in suitable manner.

4. A composition of matter for simultaneously flame-proofing and dyeing cellulosic media consisting of the products of reaction together with unreacted residues of the following constituents in approximately the following relative proportions; namely,

| | |
|---|---|
| Meta-gelatine solution | 5000 c. c. |
| Ammonium sulphate | 1000 grams |
| Ammonium carbonate | 500 grams |
| Boric acid | 500 grams |
| Zinc sulphate | 430 grams |
| 2% neutral lime soap suspension containing 2% starch | 1000 c. c. |
| Acidified dye solution (sufficient to color) | |
| Water (sufficient to control concentrations) | 5000 c. c. |

5. A composition of matter for flame-proofing and dyeing cellulosic media consisting of the products of reaction together with unreacted residues of the following constituents; namely, meta-gelatine solution, ammonium sulphate, ammonium carbonate, boric acid, zinc sulphate, 2% neutral lime soap suspension containing 2% starch, acidified dye solution (sufficient to color), and water (sufficient to control concentrations).

6. A process for making a coloring and flame-proofing composition of matter comprising heating 5000 c. c. of meta-gelatine solution to about 110° F., adding thereto 1000 grams of ammonium sulphate and 500 grams of ammonium carbonate; preparing a solution of 500 grams of boric acid in 2500 c. c. of water at 150° F., cooling to 110° F. and adding the same to the meta-gelatine-ammonium sulphate-ammonium carbonate solution; preparing a solution containing 2500 c. c. of water at 110° F., 430 grams of zinc sulphate and enough acidified dye solution to yield the desired coloring effect and adding the same to the foregoing solutions; adding 1000 c. c. of 2% neutral lime soap suspension containing 2% starch; mixing and digesting all the solutions for about 30 minutes at about 120° F.

7. A process for making a coloring and flame-proofing composition of matter comprising preparing as a first composition a solution containing meta-gelatine, ammonium sulphate and ammonium carbonate; preparing as a second composition a solution containing boric acid and water; preparing as a third composition a solution containing water, zinc sulphate and dye; preparing as a fourth composition a suspension containing lime soap and starch, mixing and digesting all four solutions.

8. A process for simultaneously coloring and flame-proofing a cellulosic medium in a single treating operation comprising preparing a composite composition of matter in accordance with claim 4 and applying the composition to the medium whereby it is dyed and flameproofed.

9. In combination, a cellulosic medium and a composition of matter for flameproofing and dyeing the same comprising the products of reaction of the following constituents in approximately the following relative proportions insofar as their affinities and concentrations enable them to react, there being certain unreacted contents; namely,

| | |
|---|---|
| Meta-gelatine solution | 5000 c. c. |
| Ammonium sulphate | 1000 grams |
| Ammonium carbonate | 500 grams |
| Boric acid | 500 grams |
| Zinc sulphate | 430 grams |
| 2% neutral lime soap suspension containing 2% starch | 1000 c. c. |
| Acidified dye solution (sufficient to color) | |
| Water (sufficient to control concentrations) | 5000 c. c. |

FREDERICK W. HOCHSTETTER.